April 5, 1949.  J. W. MOORE  2,466,464
PIPE PATTERN MAKER
Filed Feb. 26, 1947  3 Sheets-Sheet 1
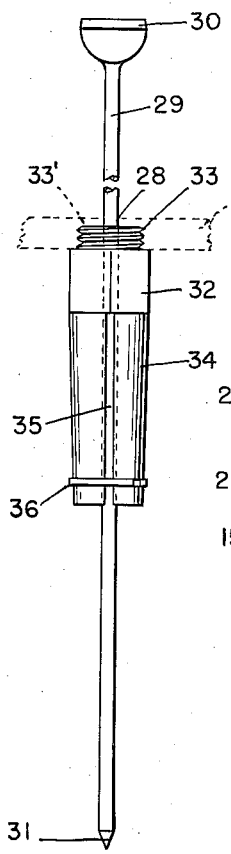
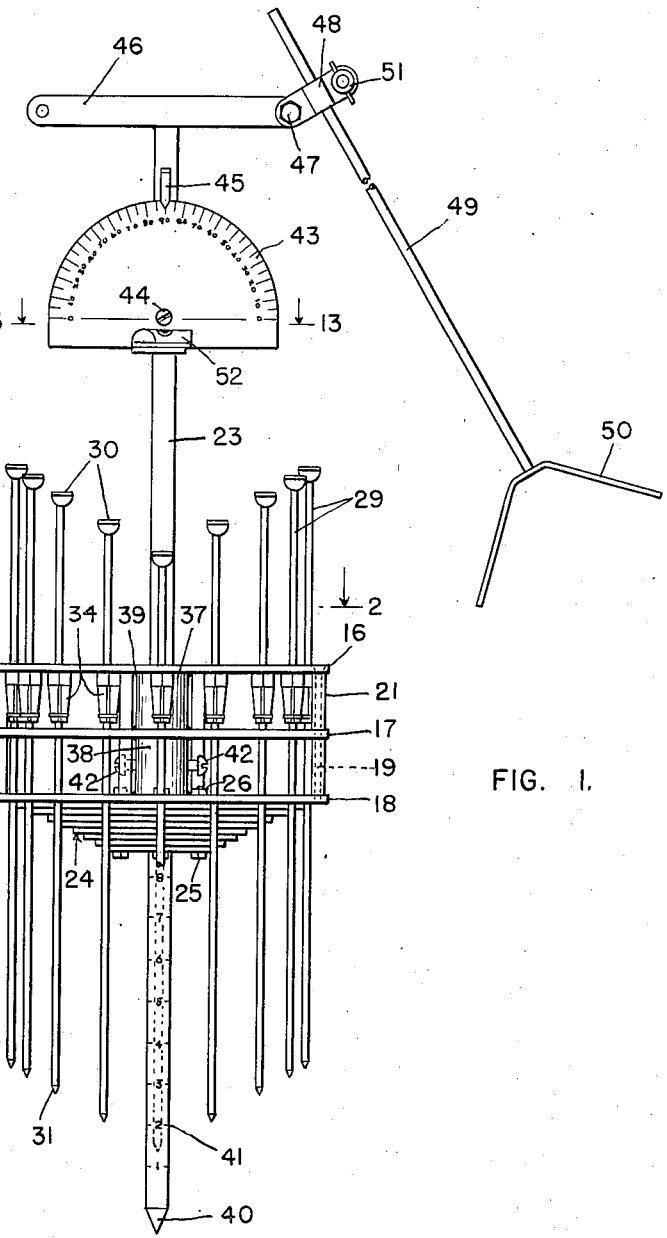
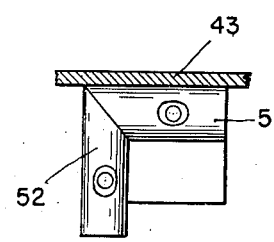
FIG. 12.
FIG. 11.
FIG. 1.
FIG. 13.
Inventor
JAMES W. MOORE,
Cushman Darby Cushman
Attorneys April 5, 1949.  J. W. MOORE  2,466,464
PIPE PATTERN MAKER
Filed Feb. 26, 1947  3 Sheets-Sheet 2

Inventor
JAMES W. MOORE,
Attorneys

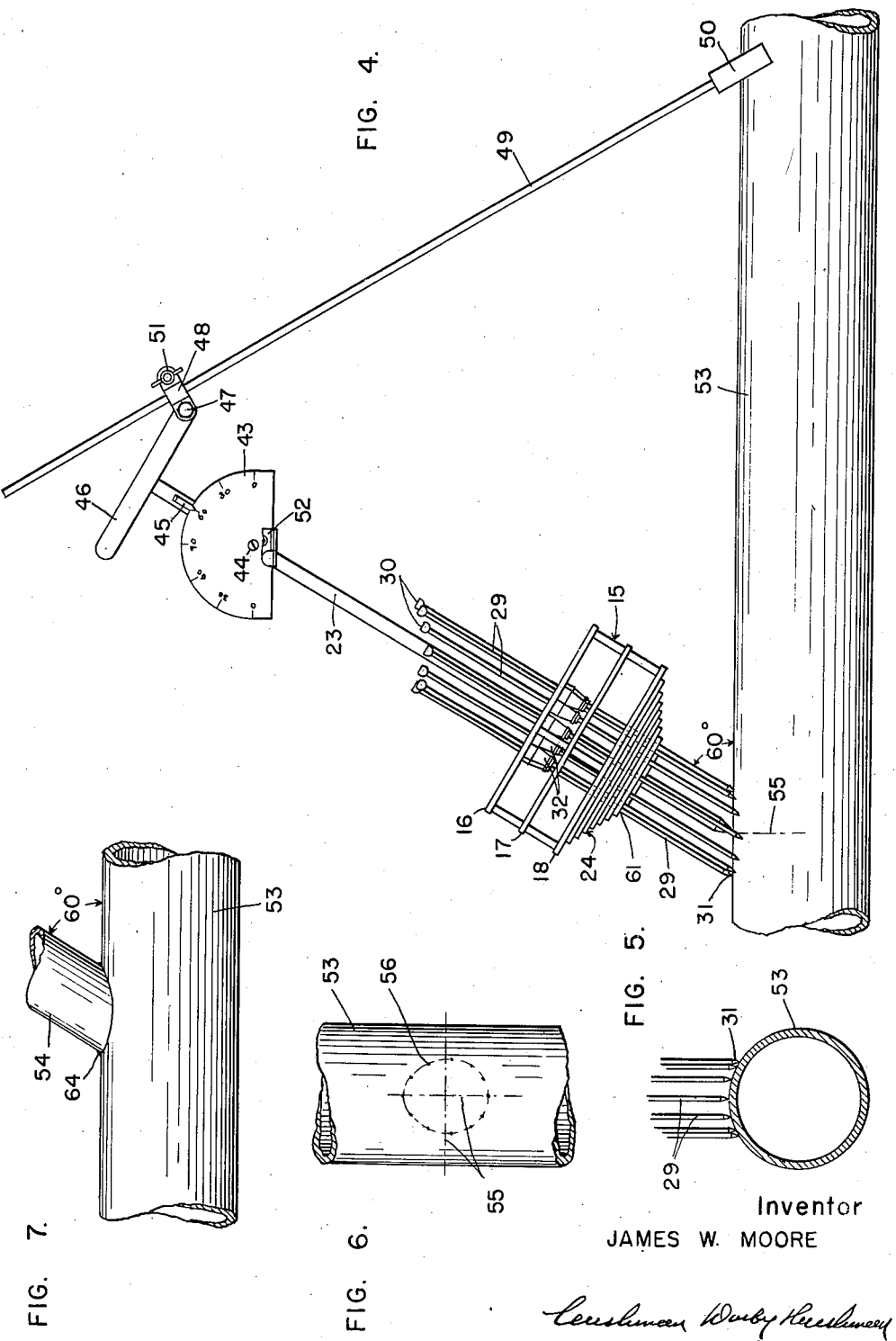

Patented Apr. 5, 1949

2,466,464

UNITED STATES PATENT OFFICE 2,466,464

PIPE PATTERN MAKER

James W. Moore, St. Albans, W. Va.

Application February 26, 1947, Serial No. 731,069

6 Claims. (Cl. 33—175)

The present invention relates to pipe templets and more particularly to an instrument for making pipe or tube patterns to accurately position and cut a pipe to the proper size and at any desired angle, so as to fit into another pipe or tubular member.

An important object consists in providing a simple, efficient and economical means and method for making a cylindrical pattern of a proposed pipe or tube, such as a branch pipe that is to be connected or welded at a predetermined angle to a main pipe.

Other objects and advantages of the invention will become apparent from the following description when taken in conjunction with the accompanying claims and drawings.

Referring to the drawings in which is disclosed a preferred embodiment of the invention:

Figure 1 is a front view of the pattern maker and its associated parts.

Figure 4 is a side view of the instrument positioned on a main pipe so as to form a pattern of a branch pipe to be connected to the main pipe at an angle of 60°.

Figure 5 is a detailed end view of Figure 4.

Figure 6 is a plan view of Figure 5 with the pointer rods removed and showing in outline the shape of the opening to be formed in the main pipe.

Figure 7 is a side view of the main pipe showing the connection of the branch pipe thereto.

Figure 11 is an enlarged detail view of one of the pointer rods and a stay member for releasably maintaining the rod in a fixed position relative to the guide head.

Figure 12 is a plan view of Figure 11, and

Figure 13 is a detail sectional view taken substantially along the line 13—13 of Figure 1.

Figure 10:
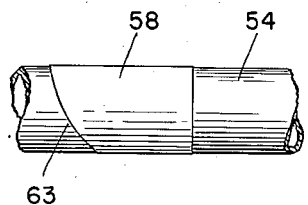
Figure 10 shows a pipe with the pattern applied over one end thereof so that the branch pipe may be cut along the contour of the pattern to accurately fit an opening in the main pipe.

The pipe pattern or profile maker includes an instrument or tool having a guide head that is longitudinally movable on a centrally disposed centering member or bar. The guide head at its lower or inner end is provided with a plurality of stepped cylindrical plates or shoulder members of progressively decreasing diameters that correspond in sizes to the diameters of the various sizes of standard branch pipes or tubes with which the instrument may be associated to form the different sizes of patterns. The guide head and stepped plates are provided with a series of concentrically disposed aligned openings. The openings in the guide head and each of the stepped plates concentrically describe circle outlines having diameters corresponding to the different pipe diameters that may be formed by the instrument. Pointer rods extend through the transverse aligned openings in the guide head and the stepped plates, and releasable means are associated with the pointer rods for maintaining the same in a fixed position relative to the guide head. The centering member extends outwardly from the guide head and the pointer rods, and is provided with a protractor which is operatively connected to a guide arm arranged to rest on the main pipe, so that the guide head and its associated parts may be accurately and properly positioned on the main pipe at the desired angle to form a cylindrical pattern of the shape of the end of the branch pipe to be connected to the main pipe. The guide head is longitudinally slidable on the centering bar and the latter has a graduated scale for indicating the position the guide head is to be moved and set, so that the ends of the pointer rods below the stepped plates will correspond in length to the particular size of the branch pipe to be connected to the main pipe. Releasable means are provided for maintaining the guide head in a fixed position on the centering bar.

The location and shape of the branch pipe are marked on the main pipe at the proper angle, by the selective movement of the pointer rods into engagement with the main pipe, so as to indicate the size and shape of the opening to be tapped in the main pipe to receive the branch pipe. The pointer rods defining the contour of the selected branch pipe diameter are then locked in position to prevent longitudinal movement thereof relative to the guide head, and the guide head is moved on the centering bar and set to register with the proper scale. The guide head is then transferred to a table on which a paper sheet for receiving the pattern is laid out flat and is attached to the table with one edge aligning with the adjacent edge of the table. The guide head now is moved against the edge of the table so that the stepped plate conforming with the particular diameter of the branch pipe, will rest on the top of the table and the locked pointer rods will extend laterally over the paper. The guide head is then rotated a complete revolution on the table through 360°. During this movement as each of the locked pointer rods contacts the paper, it is marked on the paper so as to chart a cylindrical pattern of the proper shape of the end of the branch pipe that is to be connected to the main pipe. The pattern is then cut along this contour and wrapped over the branch pipe so that the end thereof may be cut to accurately fit into the opening in the main pipe and at the desired angle.

Figure 2:
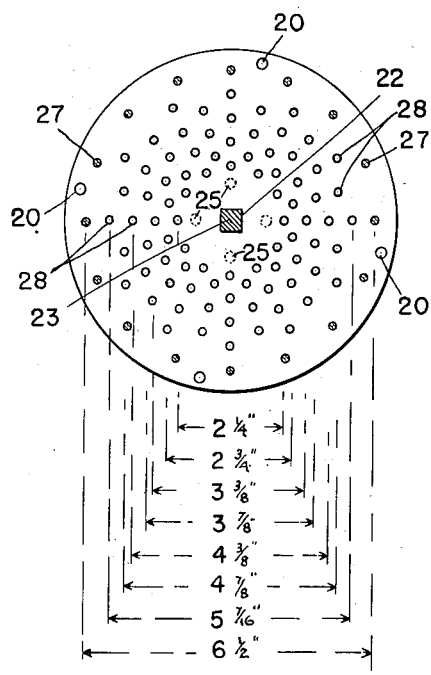
Figure 2 is a sectional view taken substantially along the line 2—2 of Figure 1.
Figure 3:
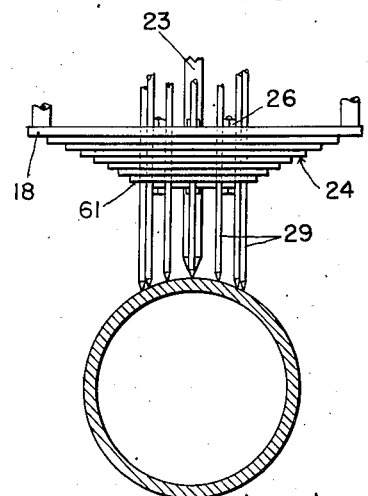
Figure 3 is a detail side view of the stepped plates associated with the guide head and showing the pointer rods engaging a pipe to mark the outline of an opening to be formed therein.

Referring to the drawings in which like numerals indicate like parts in the several views, the pipe or tubing pattern maker instrument comprises a guide head 15 which may include a top plate 16, an intermediate plate 17 and a lower plate 18 (Fig. 1) which are preferably of cylindrical shape and are uniformly spaced apart and connected together by four transverse bolts 19 that extend through vertically aligned openings 20 positioned adjacent the outer periphery of the plates. Spacer sleeves 21 through which the bolts 19 extend are positioned between the intermediate plate 17 and the end plates 16 and 18 so as to maintain the plates in proper spaced position. Each of the plates is provided with a central polygonal shaped opening 22 (Fig. 2) which is arranged to receive an elongated similarly shaped centering member or bar 23. Extending outwardly and downwardly from the lower plate 18 are a plurality of stepped cylindrical plates 24 of progressively decreasing diameters and corresponding in sizes to standard sizes of pipes or tubes that may be connected by welding to pipe mains or the like. The plates 24 are secured to the lower plate 18 by four diametrically disposed threaded bolts 25 (Fig. 2) that extend through four aligned openings in the plates and are detachably secured to the plates by the nuts 26. The top plate 16 and the intermediate plate 17 are preferably formed adjacent their outer periphery with sixteen circumferentially spaced openings 27, which constitute the outline of a circle having a 6½ inch diameter and are used to form a pattern of a 6 inch pipe. Within this circle and corresponding to the number of stepped plates 24, there are formed concentrically disposed openings or apertures 28 which constitute circles of progressively reduced diameters and each of these inner circles is preferably formed with twelve of the apertures 28 to form patterns of smaller sizes of pipes. Arranged selectively to be inserted in the concentrically disposed transverse openings 27 and 28 are movable pointer rods 29 and preferably sixteen of these rods are used. Each rod 29 is of such a length as to extend through the guide head 15 and is provided at its upper end with an operating handle 30 and with a pointed lower end 31. Each of the rods 29 is arranged to be maintained in a locked or fixed position relative to the guide head 15 through the instrumentality of a stay member 32 having a reduced threaded portion 33 that is connected to an enlarged recess 33' formed in the underside of the plate 16 and which registers with the opening 28 (Fig. 11).

The stay member 32 has depending curved arms 34 provided with vertical opposed slots 35 so as to impart resiliency to the arms 34 so that they may frictionally engage the pointer rods 29 and be maintained in locked position relative to the guide head 15 by any suitable means such as the spring rings 36.

Between the plates 16, 17 and 18 and registering with the central openings 22 are supporting sleeves 37 and 38 which are welded as at 39 to the adjacent plates and provide means for reinforcing the plates and also co-act with the sleeves 19 for maintaining the plates properly spaced apart. The lower end of the centering bar or member 23 is pointed as at 40 and may be provided with spaced scale graduations 41 corresponding to the number and size of different pipe diameters that may be formed by the pattern instrument. The guide head 15 is longitudinally movable on the bar 23 and is maintained in any fixed adjusted position relative thereto by the set screws 42 which extend through one of the sleeves such as the sleeve 38 so as releasably to engage the bar 23. The upper portion of the bar 23 carries a protractor 43 which may be adjustably and pivotally connected thereto by the set screw 44 and with which is associated a fixed pointer 45 on the bar 23. The upper end of the bar 23 terminates in a cross bar 46 pivoted at one end as at 47 to a clamp 48 that receives an elongated arm 49 having at its lower end a curved guide 50. The guide 50 is arranged to rest upon the main pipe in the operation of the instrument to form a pattern of the end of a branch pipe or the like of the desired shape and at the proper angle to the main pipe or tubular member. The arm 49 is slidable in the clamp 48 and is secured thereto by the set screw 51. A double spirit level 52 (Fig. 13) is connected to the protractor 43 so as to prevent the centering rod 23 from leaning out of plumb and for accurately setting the instrument and the protractor at a predetermined angle.

Figure 9:
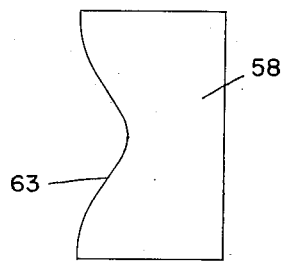
Figure 9 is a plan view of the cut-out pattern showing the shape of the end of the branch pipe.
Figure 8:
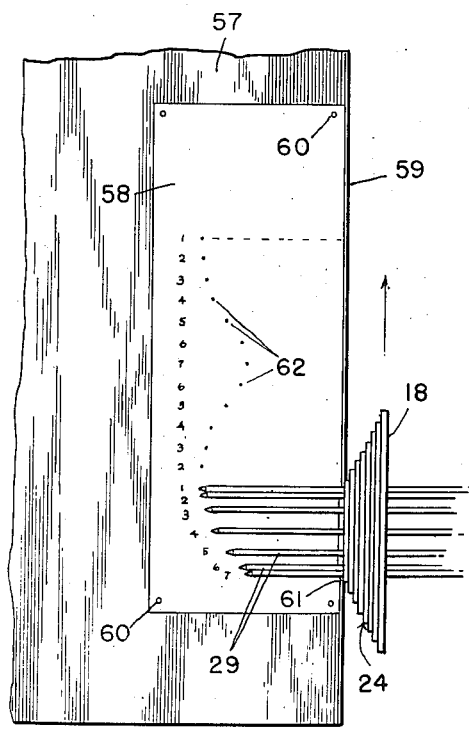
Figure 8 is a detail plan view of a table on which is mounted the paper and showing how the instrument after the pointer rods have been set to make a cylindrical pattern of a pipe of a certain diameter is moved over the paper to chart the shape of the end of the branch pipe in order that it may properly fit into a main pipe at a predetermined angle.

In operation, assuming it is desired to tap a main pipe or tube 53 (Fig. 7) so as to connect at a predetermined point a 3 inch pipe 54 at an angle of 60° to the main pipe 53; twelve of the pointer rods 29 are concentrically inserted through registering openings 28 in the guide head 15 and the stepped plate that corresponds to this particular size of pipe, so as to form in outline a circle of 3 inches in diameter. It will be noted that the rods 29 extend through the openings 28 in the stepped plates above or which are larger in diameter than the 3 inch pipe plate but not those of a smaller diameter. The main or 6 inch pipe 53 is then laid up level and a center line 55 (Fig. 4) is drawn on the pipe 53 at the point the pipe is to be tapped. The pipe 53 is then center-punched and the bar 23 of the instrument is brought into contact with the center-punch at the point where the branch pipe 54 is to be connected to the main pipe 53. The protractor 43 previously has been set at the 60° angle and the arm 49 positioned so that the rest 50 engages the main pipe 53 in order to support the instrument at this angle. The cross bar 24 is then clamped by the set screw 51 to the arm 49. The guide head 15 is now bodily moved longitudinally on the guide bar 23 until it registers with the marker 41 thereon that indicates the position of the guide rod when forming a pattern for a 3 inch pipe or tube. The guide head 15 is clamped in this position by the set screws 42. Two of the pointer rods 29 which are 180° apart are placed on the center line 55 of the pipe 53 and the other rods 29 constituting the 3 inch diameter circle are then pushed down until they touch the pipe 53 (Fig. 5) and are locked in position by applying the spring rings 36 to the arms 34 of the rod stays 32. The pointer rods 29 indent or mark the pipe 53 to form the oval-shaped outline 56 (Fig. 6) which when tapped forms an opening for accurately receiving the 3 inch pipe 54 at an angle of 60°. The instrument 15 with the pointer rods 29 in their locked position is then removed from the pipe 53 and the arm 49 withdrawn from the clamp 48, and the instrument is transferred to a table 57 (Fig. 8) on which is positioned a sheet of paper 58 of suitable size and shape to receive the outline thereon of the pattern. The pattern paper 58 has its outer edge 59 in vertical alignment with the adjacent edge of the table 57 and may be detachably fastened to the table in any suitable manner such as by the thumb tacks 60. The shoulder 61 of the stepped plate corresponding to the 3 inch diameter pipe, is now positioned to overlap and rest on the top of the table so that the twelve fingers 29 of different lengths extend laterally across and over the paper 58. The guide head 15 is then rotated on the paper to make a complete revolution of 360°, and as each of the twelve fingers contacts the paper the outer end thereof is marked as at 62 on the paper so as to outline or chart the configuration on the paper pattern 58 of the contour of the end of the branch pipe that is to be connected to the main pipe. When this operation is completed the guide head 15 and the marked paper pattern 58 are removed from the table and the pattern is cut along the outline so as to assume the configuration 63 (Fig. 9). The formed pattern is then wrapped around the 3 inch pipe 54 (Fig. 10) adjacent the end to be cut, so that this end portion of the pipe may be severed along the outline 63 in order to accurately conform in size and shape with the opening 56 (Fig. 6) of the main pipe 53 when inserted therein at the desired angle of 60°. The branch pipe 54 is then welded as at 64 to the main pipe 53.

For the purpose of illustration, eight stepped plates 24 are shown connected to the lower portion of the guide head 15 and represent standard diameters of pipes varying between 1 and 6 inches in diameter. Manifestly, the number of stepped plates may be changed depending upon the particular type of work with which the pattern instrument is to be used. The plates 24 while shown detachably connected to the guide head 15 may be formed integral therewith.

As shown in Figure 1 the rods 29 are circumferentially disposed in the outer peripheral openings 27 so that the instrument may be used for marking a 6 inch hole in a pipe by moving the sixteen pointer rods 29 extending through these openings into contact with the pipe to be tapped.

It will be seen that the pattern maker instrument may efficiently be used not only to mark a pipe or tube to be tapped, but also for insuring that a branch pipe or connection of any desired size will have the end that is to be inserted and welded in the opening of another pipe, at any angle, properly shaped. Manifestly the instrument is equally efficient for use in forming cylindrical patterns for various types of tubular constructions in which precision and accuracy of the shape and location of the interconnecting parts are essential.

It will be understood that the form of invention shown and described is merely illustrative of a preferred embodiment and that such changes may be made as fall within the purview of one skilled in the art without departing from the spirit of the invention and the appended claims.

I claim:

1. A templet machine of the class described including a guide head having cylindrical stepped members of progressively reduced diameters extending outwardly from one side thereof, said guide head and stepped members having centrally aligned openings, a centering bar extending through said openings, said guide head and stepped members being longitudinally slidable on said centering bar, said guide head and each stepped member having concentrically disposed aligned transverse apertures constituting circle outlines of progressively reduced diameters, and pointer rods extended through selected concentric apertures so as to be moved into contact with a tubular member, the parts being constructed and arranged so that the centering bar and selective pointer rods may be moved into contact with the tubular member to mark a predetermined size of opening to be formed therein.

2. A templet machine of the class described including a guide head having cylindrical stepped members of progressively reduced diameters extending outwardly from one side thereof, said guide head and stepped members having centrally aligned openings, a centering bar extending through said openings, said guide head and stepped members being longitudinally slidable on said centering bar, means for releasably securing the guide head to the centering bar, said guide head and each stepped member having concentrically disposed aligned transverse apertures constituting circle outlines of progressively reduced diameters, and pointer rods extended through selected concentric apertures so as to be moved into contact with a tubular member, the parts being constructed and arranged so that the centering bar and selective pointer rods may be moved into contact with the tubular member to mark a predetermined size of opening to be formed therein.

3. A templet machine of the class described including a guide head having cylindrical stepped members of progressively reduced diameters extending outwardly from one side thereof, said guide head and stepped members having centrally aligned openings, a centering bar extending through said openings, said guide head and stepped members being longitudinally slidable on said centering bar, said guide head and each stepped member having concentrically disposed aligned transverse apertures constituting circle outlines of progressively reduced diameters, pointer rods extended through selected concentric apertures so as to be moved into contact with a tubular member, and means releasably associated with the pointer rods for preventing longitudinal movement thereof relative to the guide head, the parts being constructed and arranged so that the centering bar and selective pointer rods may be moved into contact with the tubular member to mark a predetermined size of opening to be formed therein.

4. A pipe templet instrument of the class described including a guide head having a central opening, stepped cylindrical plates connected to one end of the guide head and having central openings registering with the central opening in the guide head, said stepped plates being of progressively reduced diameters, said guide head and each stepped plate having concentrically disposed aligned transverse apertures constituting outlines of circles of progressively reduced diameters, a centering member extending through said central openings, pointer rods extended through said apertures, and releasable means associated with the pointer rods for selectively preventing longitudinal movement of the rods relative to the guide head, the parts being constructed and arranged so that the centering member and selective pointer rods may be moved into contact with a tubular member to mark a predetermined size of opening to be formed therein.

5. A pipe templet machine of the class described including a guide head having spaced plates constituting an upper plate, an intermediate plate and a lower plate, retaining bolts extending through said plates, spacer sleeves carried by said bolts for maintaining the plates in spaced position, a cylindrical stepped member connected to the lower plate, said plates and said stepped member having concentrically disposed aligned transverse apertures constituting circle outlines of progressively reduced diameters, said plates and stepped member having centrally aligned transverse openings, a centering bar extending through said central openings, said guide head being longitudinally movable on the centering bar, means for releasably securing the guide head to the centering bar, pointer rods extended through said apertures and engage a tubular member, stay means connected to one of the plates and registering with the apertures therein, said stay means having yieldable arms for engaging the pointer rods extending through said apertures, and means for clamping the yieldable arms to the pointer rods to prevent longitudinal movement of the stay rods relative to the guide head.

6. A pipe templet machine of the class described including a guide head having spaced plates constituting an upper plate, an intermediate plate and a lower plate, retaining bolts extending through said plates, spacer sleeves carried by said bolts for maintaining the plates in spaced position, a substantially cylindrical stepped member connected to the lower plate, said plates and said stepped member having concentrically disposed aligned transverse apertures constituting circle outlines of progressively reduced diameters, said plates and stepped member having centrally aligned transverse openings, a centering bar extending through said central openings, said guide head being longitudinally movable on the centering bar, means for releasably securing the guide head to the centering bar, pointer rods extended through said apertures and engage a tubular member, one of the plates having the underside thereof provided with enlarged threaded recesses registering with the apertures therein, stay members having reduced threaded end portions arranged to fit into the threaded recesses, said stay members having yieldable depending arms, and spring means engaging said arms for moving and maintaining the same in frictional engagement with the pointer rods to prevent longitudinal movement thereof relative to the guide head.

JAMES W. MOORE.

REFERENCES CITED

The following references are of record in the file of this patent:

UNITED STATES PATENTS

| Number | Name | Date |
| --- | --- | --- |
| 397,132 | Kimball | Feb. 5, 1889 |
| 1,660,616 | James | Feb. 28, 1928 |
| 2,380,919 | Bugenhagen | Aug. 7, 1945 |